United States Patent
Jeon et al.

(10) Patent No.: US 11,347,087 B2
(45) Date of Patent: May 31, 2022

(54) ACOUSTO-OPTIC INTERACTIVE STRUCTURE

(71) Applicant: KOREA ADVANCED INSTITUTE OF SCIENCE AND TECHNOLOGY, Daejeon (KR)

(72) Inventors: Wonju Jeon, Daejeon (KR); Junyong An, Daejeon (KR); Hyeonbin Ryoo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 74 days.

(21) Appl. No.: 16/850,235

(22) Filed: Apr. 16, 2020

(65) Prior Publication Data
US 2020/0333643 A1     Oct. 22, 2020

(30) Foreign Application Priority Data

Apr. 16, 2019   (KR) .......................... 10-2019-0044209
Apr. 3, 2020    (KR) .......................... 10-2020-0040784

(51) Int. Cl.
*G02F 1/11*     (2006.01)
*G02F 1/33*     (2006.01)

(52) U.S. Cl.
CPC .............. *G02F 1/116* (2013.01); *G02F 1/33* (2013.01)

(58) Field of Classification Search
CPC ... G02F 1/11; G02F 1/116; G02F 1/33; G02F 1/332; G02F 1/335; G02F 1/3134;
(Continued)

(56) References Cited

U.S. PATENT DOCUMENTS

2007/0236772 A1   10/2007   Pannell et al.
2009/0284826 A1*  11/2009   Langdon ................. G02F 1/116
                                                              359/308

FOREIGN PATENT DOCUMENTS

JP    2003-262720    9/2003
JP    2004-317701    11/2004
(Continued)

OTHER PUBLICATIONS

I.E. Psarobas et al., "Enhanced acousto-optic interaction in a one dimensional phoxonic cavity", Physical Review B 82, 174303 (2010).
(Continued)

*Primary Examiner* — Jie Lei
(74) *Attorney, Agent, or Firm* — Lex IP Meister, PLLC (57) ABSTRACT

An acousto-optic structure according to an exemplary embodiment of the present invention is a stacked structure for inducing an interaction between incident acoustic wave and incident optical wave, and it includes: a pair of multi-layered structures including a structure in which two layers with different acoustic impedance and optical impedance are alternately arranged in a direction in which the acoustic wave and the optical wave propagate; and a cavity layer disposed between the pair of multi-layered structures in the direction in which the acoustic wave and the optical wave propagate, and made of a medium having acoustic impedance and optical impedance that are different from those of interfacing layers at both sides, wherein the two layers are symmetrically arranged with respect to the cavity layer so that the acoustic wave and the optical wave may be confined in the cavity layer.

16 Claims, 7 Drawing Sheets

(58) Field of Classification Search
CPC .. G02F 1/017; G02F 1/01708; G02F 2201/16; G02F 2202/32; G02F 2203/24; H01S 3/106; H01S 3/1068; H01S 3/117
USPC ....... 359/305, 308, 310, 285, 313, 314, 346, 359/347, 359
See application file for complete search history.

(56) References Cited

FOREIGN PATENT DOCUMENTS

| | | |
|---|---|---|
| JP | 2005-284036 | 10/2005 |
| JP | 2006-023341 | 1/2006 |
| KR | 10-2012-0087631 | 8/2012 |
| KR | 10-2013-0002049 | 1/2013 |
| KR | 10-2014-0108032 | 9/2014 |
| KR | 10-2017-0122165 | 11/2017 |
| KR | 10-2019-0019029 | 2/2019 |

OTHER PUBLICATIONS

Evangelos Almpanis et al., "Breakdown of the linear acousto-optic interaction regime in phoxonic cavities", Optics Express 31607 (2014). DOI:10.1364/OE.22.031595.
N. Papanikolaou et al., "Light modulation in phoxonic nanocavities". Microelectronic Engineering 90 (2012) 155-158.

* cited by examiner

ACOUSTO-OPTIC INTERACTIVE STRUCTURE

CROSS-REFERENCE TO RELATED APPLICATION

This application claims priority to and the benefit of Korean Patent Application No. 10-2019-0044209 filed in the Korean Intellectual Property Office on Apr. 16, 2019, the entire contents of which are incorporated herein by reference.

BACKGROUND OF THE INVENTION

(a) Field of the Invention

The present invention relates to an acousto-optic structure. More particularly, the present invention relates to a multi-layered structure for enhancing an interaction between incident acoustic waves and optical waves.

(b) Description of the Related Art

An acousto-optic interaction is a phenomenon that modulates propagating directions, frequencies, wavelengths, and intensity of optical waves by acoustic waves, and it was predicted by Leon Brillouin for the first time and has been experimentally confirmed by P. Debye and F. W. Sears. The acousto-optic interaction may be used in optical wave controlling devices such as optical modulators, switches, deflectors, filters, and frequency shifters. Efficiency and performance of the devices may be improved by enhancing the acousto-optic interaction, and recently, studies for enhancing the acousto-optic interaction have been in active progress.

For example, attempts to use slow optical waves so as to enhance the acousto-optic interaction or to use high-frequency acoustic waves with similar wavelength scales so as to control optical waves with short wavelength have been undertaken.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a structure for enhancing an interaction between two waves by using acoustic and optical waves with different wavelength scales.

An exemplary embodiment of the present invention provides an acousto-optic structure as a structure in which a plurality of layers are stacked so as to induce an interaction between an incident acoustic wave and an incident optical wave, including: a pair of multi-layered structures including a structure in which two layers with different acoustic impedance and optical impedance are alternately arranged in a direction in which the acoustic wave and the optical wave propagate; and a cavity layer disposed between the pair of multi-layered structures in the direction in which the acoustic wave and the optical wave propagate, and made of a medium having acoustic impedance and optical impedance that are different from those of interfacing layers at both sides, wherein the two layers are symmetrically arranged with respect to the cavity layer so that the acoustic wave and the optical wave may be confined in the cavity layer.

The two layers may include a first layer, and a second layer having acoustic impedance and optical impedance that are greater than those of the first layer, and the pair of multi-layered structures may respectively include a structure in which a plurality of unit structures made of the first layer and the second layer are stacked in a direction in which the acoustic wave and the optical wave propagate.

The cavity layer may be continuously arranged with the pair of multi-layered structures in the direction in which the acoustic wave and the optical wave propagate, and may be made of a same medium as the first layer.

A thickness of the cavity layer may be equal to or greater than ⅛ of the wavelength of the optical wave.

A thickness of the cavity layer may be twice the thickness of each unit structure.

A product of the thickness of the cavity layer and an optical refractive index of the cavity layer may be a multiple of ½ the wavelength of the optical wave.

The thickness of the first layer may be identical to the thickness of the second layer.

The first layer may be made of silicon dioxide ($SiO_2$), and the second layer may be made of silicon (Si).

The cavity layer may be continuously arranged with the pair of multi-layered structures in the direction in which the acoustic wave and the optical wave propagate, and the second layer may interfaces both sides of the cavity layer.

The pair of multi-layered structures may respectively further include a multi-layered substructure interfacing the cavity layer, and the multi-layered substructure may include a structure in which two sublayers with different acoustic impedance and optical impedance are alternately arranged in the direction in which the acoustic wave and the optical wave propagate, and may have a same thickness as one of the two layers.

The two sublayers may include a first sublayer, and a second sublayer having acoustic impedance and optical impedance that are greater than those of the first sublayer, and the multi-layered substructure may include a structure in which a plurality of subunit structures made of the first sublayer and the second sublayer are stacked in the direction in which the acoustic wave and the optical wave propagate.

The first sublayer and the second sublayer may be symmetrically arranged with respect to the cavity layer.

The first sublayer may be made of a same medium as the first layer, and the second sublayer may be made of a same medium as the second layer.

The first sublayer may be thinner than the second sublayer.

The multi-layered substructure may include at least three of the subunit structures.

The multi-layered substructure may be disposed between the cavity layer and the first layer, and may have a same thickness as the second layer.

The multi-layered substructure may be disposed between the other one of the two layers and the cavity layer.

According to an exemplary embodiment of the present invention, the interaction between the acoustic wave and the optical wave may be enhanced by disposing the cavity layer confining the acoustic wave and the optical wave on the middle of the structure in which a plurality of media are stacked.

Further, the interaction between the acoustic wave and the optical wave may be enhanced by including a structural hierarchy in the structure in which a plurality of media are stacked so as to reduce the acoustic energy loss and the radiation loss of the optical wave.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, the size and thickness of each configuration shown in the drawings are arbitrarily shown for better understanding and ease of description, and the present invention is not limited thereto.

Throughout this specification and the claims that follow, when it is described that an element is "coupled" to another element, the element may be "directly coupled" to the other element or "indirectly coupled" to the other element through a third element. Unless explicitly described to the contrary, the word "comprise", and variations such as "comprises" or "comprising" will be understood to imply the inclusion of stated elements but not the exclusion of any other elements.

Figure 1:
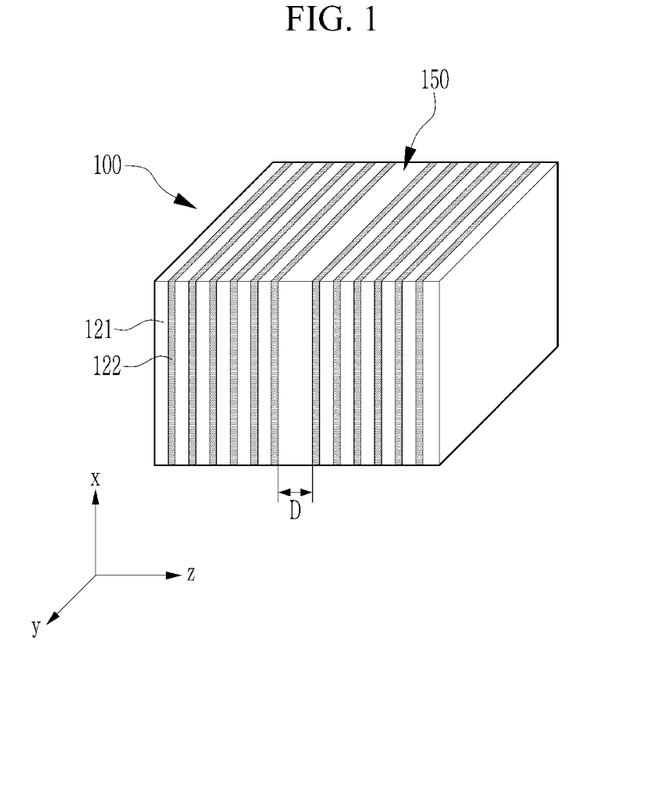
FIG. 1 shows a perspective view of an acousto-optic structure according to an exemplary embodiment of the present invention.

FIG. 1 shows a perspective view of an acousto-optic structure according to an exemplary embodiment of the present invention.

The acousto-optic structure according to an exemplary embodiment of the present invention represents a structure for inducing an interaction between incident acoustic waves and optical waves, and it is configured with a multi-layered structure in which a plurality of layers in the direction in which the acoustic waves and the optical waves propagate.

Referring to FIG. 1, the acousto-optic structure 100 has a structure in which a first layer 121 and a second layer 122 made of different media are alternately stacked. In FIG. 1, when a z-axis direction is referred to as a direction in which the acoustic wave and the optical wave propagate, the first layer 121 and the second layer 122 form an xy plane, and they have a predetermined thickness in a z-axis direction.

According to an exemplary embodiment of the present invention, a cavity layer 150 with a predetermined thickness (D) is disposed in a center of the acousto-optic structure 100, and the multi-layered structure in which the first layer 121 and the second layer 122 are stacked and the cavity layer 150 may have a continuously stacked structure. That is, the cavity layer 150 may be inserted into the center of the multi-layered structure in which the first layer 121 and the second layer 122 are stacked.

In this instance, referring to FIG. 1, the first layer 121 and the second layer 122 may be alternately and symmetrically arranged with respect to the cavity layer 150. That is, the arrangement of the first layer 121 and the second layer 122 arranged on both sides of the cavity layer 150 may be symmetric. In this instance, the multi-layered structure in which the same are arranged on both sides of the cavity layer 150 may act as a mirror with high reflectance. Particularly, the reflectance increases as a contrast of acoustic impedance and optical impedance of the first layer 121 and the second layer 122 increases. Accordingly, the acoustic wave and the optical wave incident on the acousto-optic structure 100 may be confined in the cavity layer 150 by the high reflectance of the multi-layered structure disposed on both sides of the cavity layer 150, so the acousto-optic interaction may be enhanced.

In further detail, the first layer 121 and the second layer 122 with a large contrast of acoustic impedance and optical impedance are alternately arranged, the incident wave (the acoustic wave or the optical wave) is partially transmitted and partially reflected from all the interfaces between the two layers, and all the reflected waves or all the transmitted waves interfere constructively. Accordingly, when the cavity is inserted in the center of the structure in which the layers with a large contrast of acoustic and optical impedances are alternately arranged so as to completely reflect the incident acoustic wave and the optical wave (so as to have very high reflectance on the incident acoustic wave and the optical wave), both acoustic and optical waves are confined in the cavity at a certain frequency due to the constructive interference resulting in large amplitudes of the both waves in the cavity. The above-noted phenomenon is referred to as an acoustic and optical cavity mode, and the two waves strongly interact to each other in the cavity.

In general, in order for the acoustic and optical cavity mode to occur in the acousto-optic structure 100, each of the first layer 121 and the second layer 122 that are alternately arranged must have a thickness that is equal or greater than quarter wavelength of incident wave. A reason for this is: the multi-layered structure arranged on the both sides of the cavity layer 150 must have high reflectance so as to show the cavity mode, and when a phase difference between the reflected waves is 360°, the multi-layered structure may have high reflectance. Accordingly, when the thickness of each of the first layer 121 and the second layer 122 configuring the multi-layered structure are less than quarter wavelength of incident wave, a phase change is small when the waves propagate to the respective layers, so constructive interference rarely occurs. Therefore, to induce the cavity mode, the respective layers configuring the multi-layered structure arranged on the both sides of the cavity layer 150 must have the thickness that is equal to or greater than quarter wavelength of incident wave.

Therefore, the optical wave and the acoustic wave having similar wavelength scales may be used so as to induce the acoustic and optical cavity mode to the acousto-optic structure 100. For example, the size of the above-described structure may be comparable to the wavelength scale (e.g., 1550 nm) of the optical wave used to communication of optical fibers, and the acoustic wave having a wavelength scale that is similar to the incident optical wave may be incident. However, the acoustic wave in this instance has a very high frequency that is equal to or greater than the 1 GHz, so an acoustic energy loss may occur in the layers. To reduce the acoustic energy loss, the size of the above-noted unit structure (120, refer to FIG. 2) may be configured to be large, and the optical wave and the acoustic wave with different wavelength scales may be incident, but in this case, the wavelength scale of the optical wave and the scale of the unit structure (120, refer to FIG. 2) become different, so a radiation loss of the optical wave may occur, and the size of the acousto-optic structure 100 may increase.

The acousto-optic structure 100 according to an exemplary embodiment of the present invention for enhancing the interaction between the acoustic wave and the optical wave while reducing acoustic energy loss will now be described.

Figure 2:
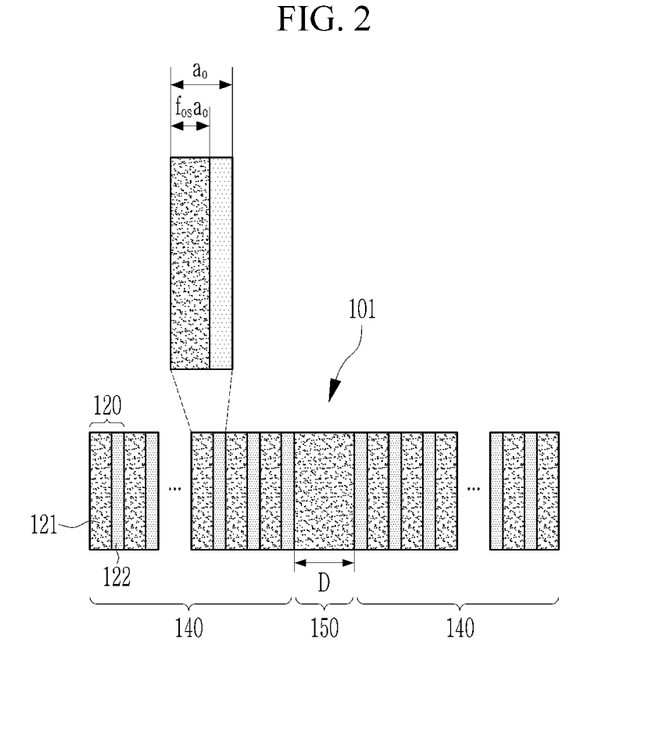
FIG. 2 shows a cross-sectional view of an acousto-optic structure according to a first example of the present invention.

FIG. 2 shows a cross-sectional view of an acousto-optic structure according to a first example of the present invention.

Referring to FIG. 2, the acousto-optic structure 101 according to a first example of the present invention includes a pair of multi-layered structures 140 and a cavity layer 150 disposed between the pair of multi-layered structures 140.

The multi-layered structure 140 includes a structure in which two different layers are alternately arranged. For example, the multi-layered structure 140 may be configured by sequentially stacking a plurality of unit structures 120, and in this instance, a plurality of unit structures 120 may be respectively formed by stacking the first layer 121 and the second layer 122. In this instance, a plurality of unit structures 120 may be stacked in the direction (a left arrow in FIG. 2) in which the acoustic wave and the optical wave are incident on the multi-layered structure.

A pair of multi-layered structures 140 are configured, and a cavity layer 150 is disposed between the pair of multi-layered structures 140. In this instance, the pair of multi-layered structures 140 and the cavity layer 150 are continuously arranged, and referring to FIG. 2, the acousto-optic structure 101 according to a first example of the present invention may have a structure in which a multi-layered structure 140, a cavity layer 150, and a multi-layered structure 140 are sequentially stacked in order.

The unit structure 120 configuring the multi-layered structure 140 may be composed of a first layer 121 and a second layer 122 each having a predetermined thickness. For example, the thickness of the first layer 121 may occupy a predetermined ratio of the thickness of the unit structure 120. Preferably, the first layer 121 and the second layer 122 may have a same thickness.

According to an exemplary embodiment of the present invention, the first layer 121 and the second layer 122 may have different acoustic and optical properties. In further detail, the first layer 121 and the second layer 122 may have different acoustic impedance and optical impedance.

According to an exemplary embodiment of the present invention, the acoustic impedance and optical impedance of the first layer 121 may be smaller than those of the second layer 122 neighboring the first layer 121 layer. In this instance, the first layer 121 and the second layer 122 may be made of a media with less optical loss in the target wavelength (e.g., a bandwidth that is near 1550 nm used for optical fiber communication). Further, the first layer 121 and the second layer 122 may be made of a media having a substantially large contrast of the acoustic property and the optical property (i.e., acoustic impedance and optical impedance). For example, the first layer 121 may be made of silicon dioxide ($SiO_2$), and the second layer 122 may be made of silicon (Si). For another example, the first layer 121 may be made of arsenic triselenide glass ($As_2Se_3$), and the second layer 122 may be made of polyethersulfone (PES).

As described above, the acoustic wave and the optical wave that are incident on the multi-layered structure 140 are transmitted or reflected depending on wavelengths by the stacked structure of the first layer 121 and the second layer 122 that are alternately repeated. In this instance, when the acoustic wave or the optical wave of a specific wavelength bandwidth is incident on the stacked structure in which the first layer 121 and the second layer 122 with a predetermined thickness are periodically repeated, constructive interference between reflected waves may occur, so the multi-layered structure 140 may have high reflectance.

According to an exemplary embodiment of the present invention, the number of unit structures 120 configuring the multi-layered structure 140 may be equal to or greater than 3. When the number of unit structures 120 is less than 3, no acousto-optic interaction occurs, and when the number of unit structures 120 is equal to or greater than 3, the acousto-optic interaction may occur.

As described above, respective thicknesses of the first layer 121 and the second layer 122 configuring the multi-layered structure 140 must have the thickness that is equal to or greater than quarter wavelength of incident wave in order for the acoustic and optical cavity modes to occur, so a thickness $a_0$ of the unit structure 120 is variable depending on the target wavelength.

The cavity layer 150 is a space where the acoustic wave and the optical wave incident on the multi-layered structure 140 are confined, and it is disposed between a pair of multi-layered structures 140. Each multi-layered structure 140 is disposed on both sides of the cavity layer 150, and referring to FIG. 2, the first layer 121 and the second layer 122 included in the multi-layered structure 140 may be symmetrically arranged with respect to the cavity layer 150. For example, a second layer 122 with greater acoustic impedance and optical impedance than those of the first layer 121 may interface the both sides of the cavity layer 150. As the multi-layered structure 140, in which the first and second layers 121 and 122 are alternately arranged, are disposed on the both sides of the cavity layer 150, it may be a structure in which a mirror for reflecting the acoustic wave and the optical wave is disposed on the both sides of the cavity layer 150, so the acoustic wave and the optical wave may be well confined in the cavity layer 150.

As the multi-layered structure 140 interfacing the both sides of the cavity layer 150 acts as a mirror, the cavity layer 150 may act as a space for confining the acoustic wave and the optical wave by reflection. That is, the optical and acoustic cavity mode must exist for the optical wave and acoustic wave that are incident through the cavity layer 150. In this instance, the cavity layer 150 may have a structure that breaks periodicity of the multi-layered structure 140 disposed on the both sides. For example, the cavity layer 150 may be made of a medium having acoustic impedance and optical impedance that are different from the media interfacing the both sides. According to an exemplary embodiment of the present invention, the cavity layer 150 may be made of a medium having acoustic impedance and optical impedance that is less than those of interfacing layers at the both sides. The cavity layer 150 may be made of a same medium (e.g., silicon dioxide) as the first layer 121, and the second layer 122 may interface the both sides of the cavity layer 150.

That is, the acoustic wave and the optical wave may be confined in the cavity layer 150 at a frequency by a Fabry-Perot resonance phenomenon in the structure in which the cavity layer 150 is disposed between the multi-layered structure 140. In this instance, due to an interference phenomenon between the acoustic waves or between optical waves in the cavity layer 150, the waves at a certain frequency remain in the cavity layer 150 and they are resonated, and the cavity layer 150 may have a predetermined gap (or a thickness, D) so that an interference phenomenon may occur between the acoustic waves or between optical waves in the cavity layer 150. For example, a product of the thickness of the cavity layer 150 and the optical refractive index of the cavity layer 150 may be a multiple of the half wavelength of light so that the optical cavity mode may exist. Constructive interference may appear when a phase difference between the optical waves in the cavity layer 150 becomes a multiple of the angle of 360°, which is because the phase that changes while the light propagates to the cavity layer 150 may be calculated by 360° *(optical refractive index of cavity layer)*2*(thickness of cavity layer)/(wavelength). Therefore, when the thickness of the cavity layer 150 is determined, the optical refractive index of the cavity layer 150 may be calculated.

The thickness (D) of the cavity layer 150 may be equal to or greater than ⅛ of the wavelength of the optical wave. Theoretically, the thickness (D) of the cavity layer 150 with the optical refractive index of n satisfies the equation of 2*D=m*(wavelength of optical wave)/(optical refractive index)/2 (where m=1, 2, 3, . . . ) so that the optical cavity mode may occur, and the optical refractive index (n) of a material existing in the natural world is 4 at a maximum, so the minimum thickness of the cavity layer 150 may be ⅛ of the wavelength of the optical wave.

According to an exemplary embodiment of the present invention, the thickness (D) of the cavity layer 150 may be twice the thickness $a_0$ of the unit structure 120 configuring the multi-layered structure 140. This is because, the acousto-optic interaction in acousto-optic structure is maximized when the thickness D of the cavity layer 150 is twice the thickness a0 of the unit structure 120 in numerical simulations, and the acousto-optic interaction in the multi-layered structure will be weaken as the thickness increases, and when it becomes greater than the same, the acousto-optic interaction reduces.

An effect of the acousto-optic structure 101 according to a first example of the present invention will now be described.

Figure 3:
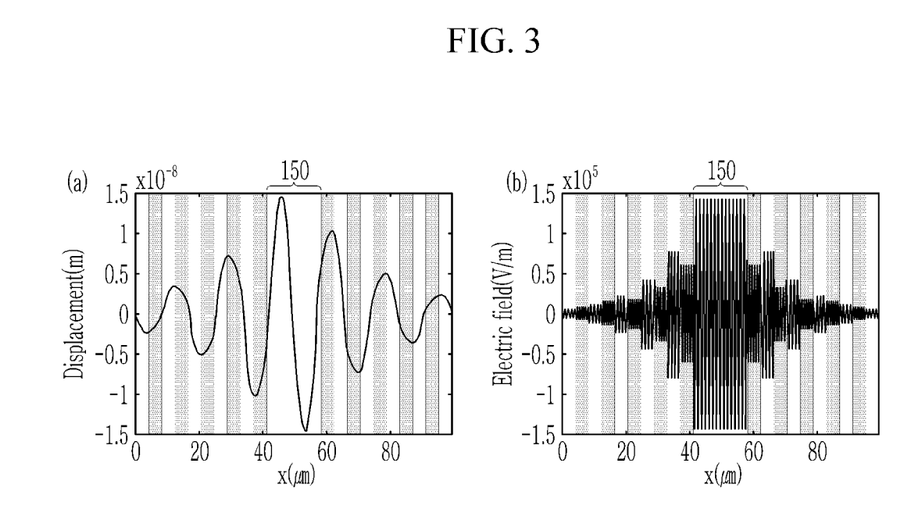
FIG. 3 shows a graph for illustrating a confinement of an acousto-optic structure according to a first example of the present invention.

FIG. 3 shows a graph for illustrating a confinement of an acousto-optic structure 101 according to a first example of the present invention. (a) and (b) of FIG. 3 show a displacement field in the acousto-optic structure at the acoustic mode frequency and an electric field in the acousto-optic structure at the optical cavity mode frequency, respectively, and in FIG. 2, the thicknesses (a content, $f_{0s}$) of the first layer 121 and the second layer 122 are the same in the unit structure 120, the first layer 121 is silicon dioxide, the second layer 122 is silicon, the thickness (D) of the cavity layer 150 is twice the thickness $a_0$ of the unit structure 120, $a_0$=8.23 μm, $f_{0s}$=0.5, the number of the unit structures 120 configuring one multi-layered structure 140 is five, and the optical cavity mode appears at 1550 nm by which the wavelength of the optical wave is mainly used to the optical-fiber communication.

Here, the thickness a0 of the unit structure 120 is decided to be 8.23 μm since the acousto-optic interaction is reduced by less than 5% due to the acoustic energy loss when the optical cavity mode appears for light with the wavelength of 1550 nm.

Referring to FIG. 3, it is confirmed that a large displacement field and a large electric field are shown on the cavity layer (150 in the graphs (a) and (b) in FIG. 3) at the frequency in the acoustic and optical cavity mode. As described above, the interaction is induced by using the acoustic wave and the optical wave with a similar wavelength scale, so a high-frequency acoustic wave must be used for the acoustic and optical cavity mode, and the acousto-optic interaction deteriorate due to an acoustic energy loss at high-frequency range. However, by controlling the thickness $a_0$ of the unit structure 120 configuring the acousto-optic structure 101 according to a first example of the present invention, the low-frequency acoustic wave with less loss may be used, and the acoustic energy loss of the acoustic wave may be reduced, resultantly enhancing the effect of the acousto-optic interaction.

A quantitative value to evaluate the interaction between the confined acoustic wave and optical wave may be expressed as a sum of Equation 1 and Equation 2, and in Equation 1 and Equation 2, p is an optical elastic coefficient, ε is permittivity, u is a displacement, E is an electric field, and ω is a frequency of the cavity mode.

$$g_{PE} = -\frac{\omega^0}{2} \frac{\int p\varepsilon^2(x)\frac{\partial u(x)}{\partial x}(E^0(x))^2 dx}{\int \varepsilon(x)(E^0(x))^2 dx} \quad \text{Equation 1}$$

$$g_{N1} = -\frac{\omega^0}{2} \frac{\sum_j (\varepsilon_{j+1} - \varepsilon_j)u(x_j)(E^0(x))^2}{\int \varepsilon(x)(E^0(x))^2 dx} \quad \text{Equation 2}$$

A numerator in Equation 1 is an integral value on the product of a displacement and a square of an electric field for a space, and a numerator in Equation 2 represents a sum of products of the square of an electric field and a displacement on a boundary. That is, in common with Equation 1 and Equation 2, the interaction between the acoustic wave and the optical wave is enhanced when the product of the displacement and the square of an electric field is large, so it is found that the interaction between the acoustic wave and the optical wave occurs substantially through a result that a large displacement field and a large electric field are generated to the cavity layer (150 in the graphs (a) and (b) of FIG. 3) in (a) and (b) of FIG. 3.

By using the value shown with reference to FIG. 3, a quantitative value of the interaction between the acoustic wave and the optical wave in the acousto-optic structure 101 according to a first example of the present invention applied in FIG. 3 is 471 GHz. The quantitative value means how much the optical cavity frequency shifts. The greater value is, the more frequency shifts of the optical cavity mode occur by the acoustic wave.

Another exemplary embodiment of the present invention configured for further enhancing the interaction between the acoustic wave and the optical wave will now be described.

Figure 4:
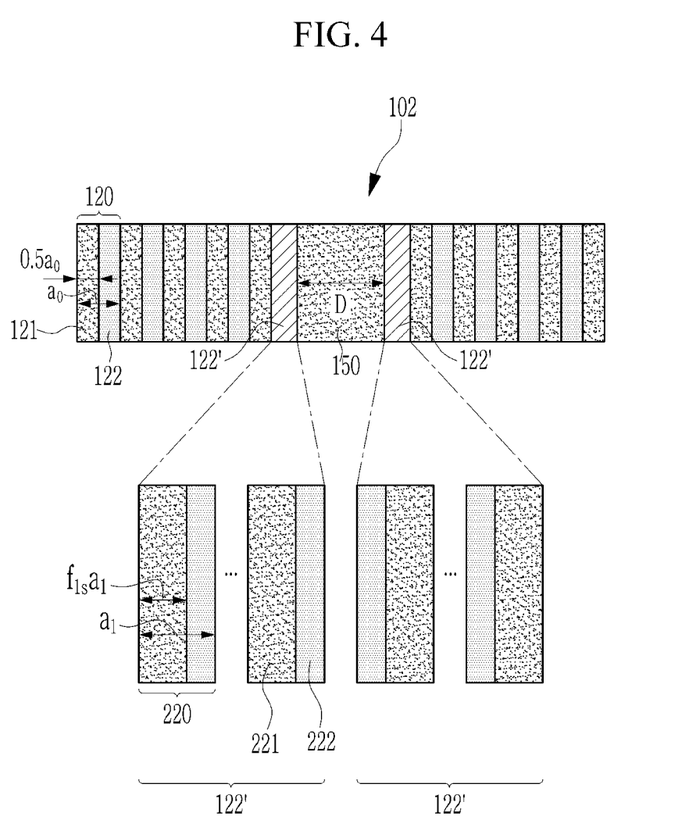
FIG. 4 shows a cross-sectional view of an acousto-optic structure according to a second example of the present invention.

FIG. 4 shows a cross-sectional view of an acousto-optic structure according to a second example of the present invention. In the second example to be described hereinafter, descriptions on the configuration that repeats the above-described first example will be omitted, and different configurations will be mainly described.

Referring to FIG. 4, the acousto-optic structure 102 according to a second example of the present invention further includes a multi-layered substructure 122'. For example, the pair of multi-layered structures arranged on both sides of the cavity layer 150 respectively include the multi-layered substructure 122' interfacing the cavity layer 150. According to the present exemplary embodiment, the multi-layered substructure 122' may include a configuration in which two sublayers made of different media are alternately arranged in a direction in which the acoustic wave and the optical wave propagate. Further, the multi-layered substructure 122' may have a same thickness as one of the first and second layers 121 and 122, for example, the second layer 122. That is, a multi-layered structure including a structural hierarchy may be disposed on the both sides of the cavity layer 150.

In detail, the multi-layered substructure 122' interfacing the both sides of the cavity layer 150 may be configured by sequentially stacking a plurality of subunit structures 220 having a smaller scale than the unit structure 120, and the subunit structure 220 may include a first sublayer 221, and a second sublayer 222 having acoustic impedance and optical impedance that are different from the first sublayer 221. That is, by inserting the stacked structures having similar wavelength scales to the optical waves into the both sides of the cavity layer 150, the acoustic wave having a relatively large wavelength scale may be controlled through the structure in which unit structures 120 with a relatively large size (or thickness) are stacked, and the optical wave with a relatively small wavelength scale may be controlled through the structure in which subunit structures 220 having a relatively small size (or thickness) are stacked.

In this instance, the first sublayer 221 and the second sublayer 222 may be symmetrically and alternately arranged with respect to the cavity layer 150, and the first sublayer 221 may be made of a same medium as the first layer 121, while the second sublayer 222 may be made of a same medium as the second layer 122. The first sublayer 221 and the second sublayer 222 may be made of media with less optical loss in the target wavelength bandwidth (e.g., a bandwidth that is near 1550 nm used for optical fiber communication). Further, the first sublayer 221 and the second sublayer 222 may be made of media with a substantially large contrast of the acoustic property and the optical property (acoustic impedance and optical impedance).

According to an exemplary embodiment of the present invention, acoustic impedance and optical impedance of the first sublayer 221 are relatively small, and acoustic impedance and optical impedance of the second sublayer 222 neighboring the same may be relatively large. For example, the first sublayer 221 may be made of silicon dioxide, and the second sublayer 222 may be made of silicon.

In this instance, the multi-layered substructure 122' interfacing the both sides of the cavity layer 150 according to a second example of the present invention must function in an identical or similar way with/to the second layer 122 according to a first example. Accordingly, a content of the second sublayer 222 configuring the subunit structure 220 with a constant thickness must be greater than the content of the first sublayer 221, so the thickness of the first sublayer 221 may be less than the thickness of the second sublayer 222.

In another way, there may be a plurality of subunit structures 220, and at least three thereof may be configured. When the number of subunit structures 220 is less than 3, they may not appropriately act as reflectors of the wave (optical wave), and when there are many subunit structures 220 and the respective sizes (thicknesses) of the layer (the first sublayer 221 and the second sublayer 222) configuring the subunit structure 220 become less than ¼ of the wavelength of the optical wave, the optical cavity mode is not shown, and the appropriate number of subunit structures may be selected. For example, it is desirable to configure three to nine subunit structures 220 so that the optical cavity mode may appear at 1550 nm.

An effect of the acousto-optic structure 102 according to a second example of the present invention will now be described.

Figure 5:
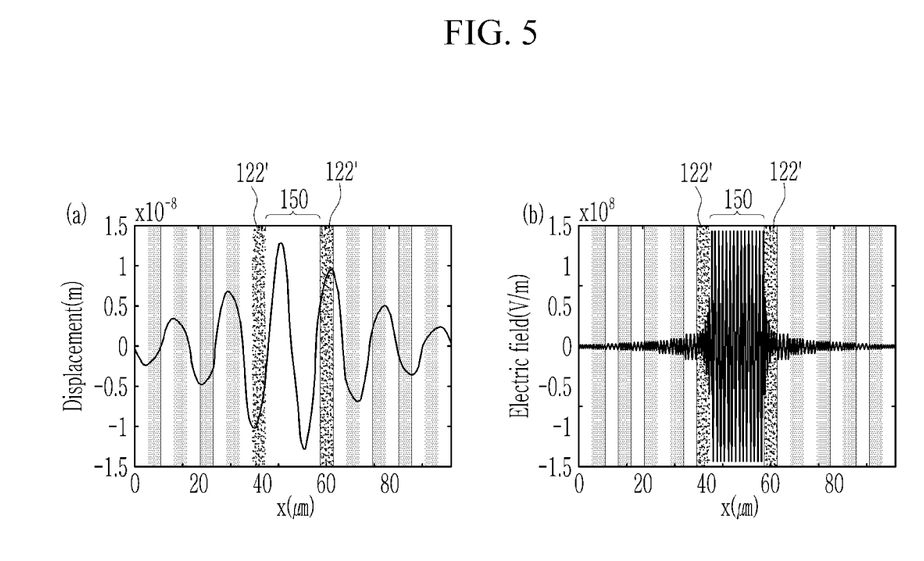
FIG. 5 to FIG. 7 show graphs for illustrating a confinement of an acousto-optic structure according to a second example of the present invention.
Figure 6:
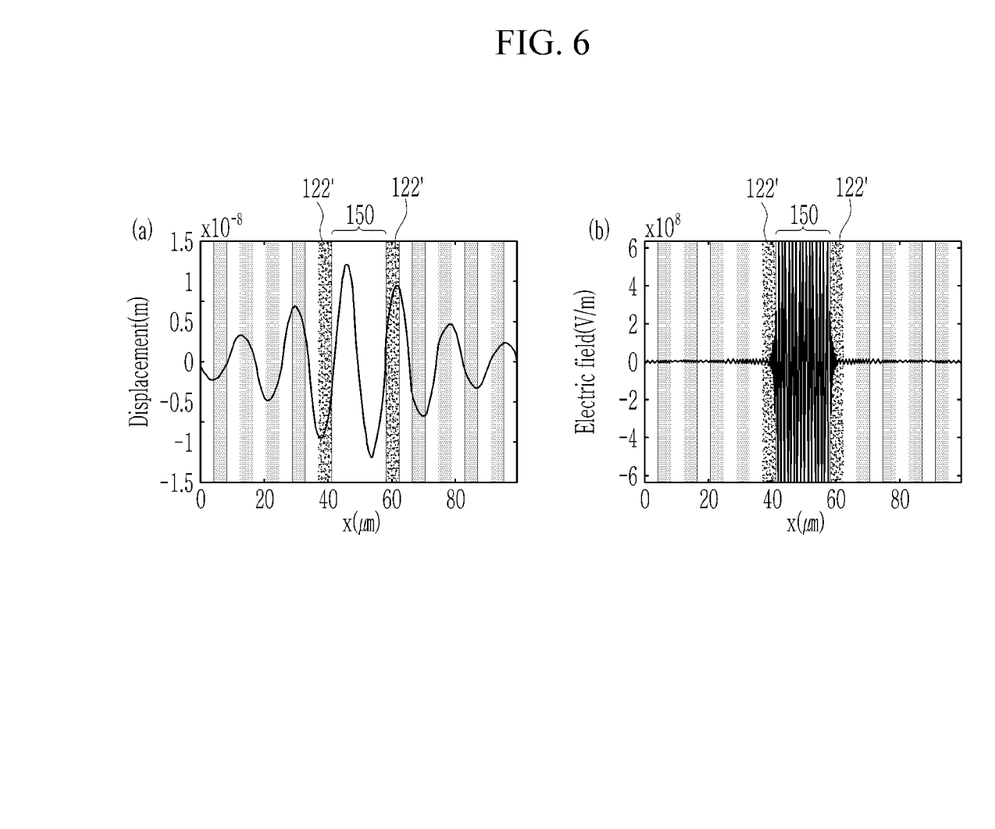
Figure 7:
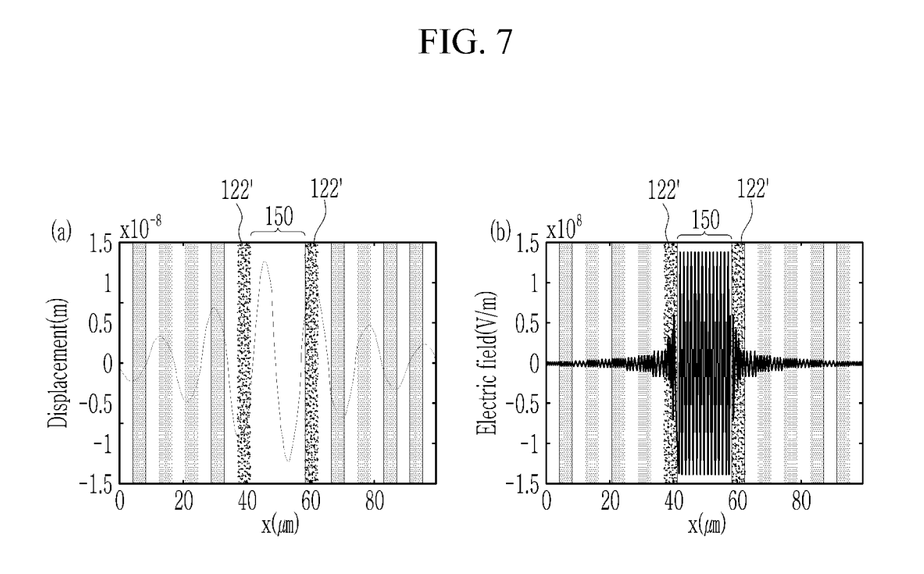

FIG. 5 to FIG. 7 show graphs for illustrating a confining effect of an acousto-optic structure 102 according to a second example of the present invention. FIG. 5 to FIG. 7 show graphs of a displacement field and an electric field with respect to position of the acousto-optic structure 102 at the frequency of the acoustic and optical cavity mode in a same condition as FIG. 3. In addition, the first sublayer 221 is silicon dioxide and the second sublayer 222 is silicon, which is a result of allowing a different number of subunit structures 220 and a thickness (or a content) of the first sublayer 221.

FIG. 5 shows a case in which there are nine subunit structures 220 disposed on the both sides of the cavity layer 150, and it is given that $f_{1s}=0.1408$ in the acousto-optic structure 102 of FIG. 4, and FIG. 6 shows a case in which there are eight subunit structures 220, and it is given that $f_{1s}=0.3064$, while FIG. 7 shows a case in which there are three subunit structures 220, and it is given that $f_{1s}=0.2834$.

Referring to FIG. 5 to FIG. 7, it is found in the acousto-optic structure 102 according to a second example of the present invention in various forms that a large displacement field and a large electric field are generated in the cavity layer 150 at the frequency of the acoustic and optical cavity mode. When the result given with reference to FIG. 5 to FIG. 7 is calculated with the quantitative value of the interaction between the acoustic wave and the optical wave that is the sum of Equation 1 and Equation 2, the case of FIG. 5 gives 913 GHz, the case of FIG. 6 gives 768 GHz, and the case of FIG. 7 gives 933 GHz. Therefore, compared to the first example, it is found that the quantitative value of the interaction between the acoustic wave and the optical wave is enhanced by about twice. This is because the acoustic wave with a relatively large wavelength scale may be controlled by the stacked structure of the unit structure 120 with a relatively large size (thickness), and the optical wave with a relatively small wavelength scale may be controlled by the subunit structure 220 with a relatively small size (thickness). That is, the incident acoustic wave and the optical wave may reduce the loss in all the media, thereby substantially enhancing the interaction between the acoustic wave and the optical wave.

Further, referring to FIG. 5 to FIG. 7, it is found that, as the value of $f_{1s}$ that is the content of the first sublayer 221 reduces, in other words, as the property of the multi-layered substructure 122' becomes similar to the property of the second layer 122 of the acousto-optic structure 101 according to a first example, acoustic wave is highly confined in the cavity.

As described, according to an exemplary embodiment of the present invention, the interaction between the acoustic wave and the optical wave may be enhanced by installing the cavity layer 150 for confining the acoustic wave and the optical wave in the middle of the multi-layered structure 140 in which two different layers 121 and 122 are periodically repeated.

Further, the interaction between the acoustic wave and the optical wave may be substantially enhanced by including a structural hierarchy in the multi-layered structures 140 disposed on the both sides of the cavity layer 150, for example, by inserting the stacked structure with a small scale in which different sublayers 221 and 222 are periodically repeated into the layer interfacing the cavity layer 150.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100, 101, 102 acousto-optic structure
120 unit structure
121 first layer
122 second layer
122' multi-layered substructure
140 multi-layered structure
150 cavity layer
220 subunit structure
221 first sublayer
222 second sublayer

What is claimed is:

1. An acousto-optic structure in which a plurality of layers are stacked so as to induce an interaction between an acoustic wave entering into the acousto-optic structure and an optical wave entering into the acousto-optic structure, comprising:
   a pair of multi-layered structures in which two layers with different acoustic impedances and optical impedances are alternately arranged in a first direction in which the acoustic wave and the optical wave propagate;
   a pair of multi-layered substructures in which two sublayers with different acoustic impedances and optical impedances are alternately arranged in the first direction, the two sublayers being thinner than the two layers; and
   a cavity layer disposed between the pair of multi-layered substructures in the first direction, and made of a medium having acoustic impedance and optical impedance that are different from those of each of interfacing sublayers at both sides of the cavity layer, and
   wherein the acoustic wave and the optical wave are confined in the cavity layer.

2. The acousto-optic structure of claim 1, wherein
   the two layers include a first layer and a second layer having acoustic impedance and optical impedance that are greater than those of the first layer, and
   the pair of multi-layered structures respectively include a plurality of unit structures made of the first layer and the second layer and stacked in the first direction.

3. The acousto-optic structure of claim 2, wherein the cavity layer is made of a same medium as the first layer.

4. The acousto-optic structure of claim 2, wherein a thickness of the cavity layer is twice the thickness of each unit structure.

5. The acousto-optic structure of claim 4, wherein the thickness of the first layer is identical to the thickness of the second layer.

6. The acousto-optic structure of claim 5, wherein the first layer is made of silicon dioxide ($SiO_2$), and the second layer is made of silicon (Si).

7. The acousto-optic structure of claim 2, wherein the pair of multi-layered structures are symmetrically arranged with respect to the cavity layer.

8. The acousto-optic structure of claim 1, wherein a thickness of the cavity layer is equal to or greater than $\frac{1}{8}$ of the wavelength of the optical wave.

9. The acousto-optic structure of claim 1, wherein a product of the thickness of the cavity layer and an optical refractive index of the cavity layer is a multiple of $\frac{1}{2}$ of the wavelength of the optical wave.

10. The acousto-optic structure of claim 1, wherein each of the multi-layered substructures has a same thickness as one of the two layers.

11. The acousto-optic structure of claim 1, wherein the two sublayers include a first sublayer; and a second sublayer having acoustic impedance and optical impedance that are greater than those of the first sublayer, and the pair of multi-layered substructures respectively includes a plurality of subunit structures made of the first sublayer and the second sublayer and stacked in the first direction.

12. The acousto-optic structure of claim 11, wherein the subunit structures are symmetrically arranged with respect to the cavity layer.

13. The acousto-optic structure of claim 12, wherein the first sublayer is made of a same medium as the first layer, and
the second sublayer is made of a same medium as the second layer.

14. The acousto-optic structure of claim 13, wherein the first sublayer is thinner than the second sublayer.

15. The acousto-optic structure of claim 13, wherein each of the multi-layered substructures includes at least three of the subunit structures.

16. The acousto-optic structure of claim 13, wherein each of the multi-layered substructures is disposed between the cavity layer and the first layer, and has a same thickness as the second layer.

* * * * *